INVENTOR.
Stanley G. Roach

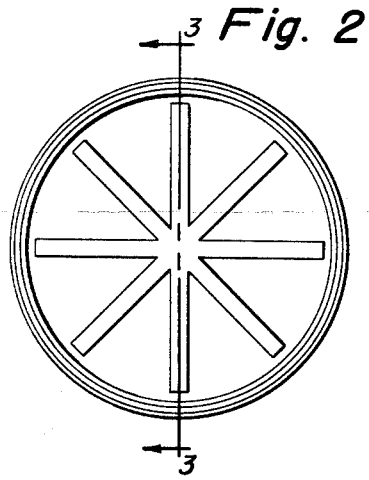
Fig. 2
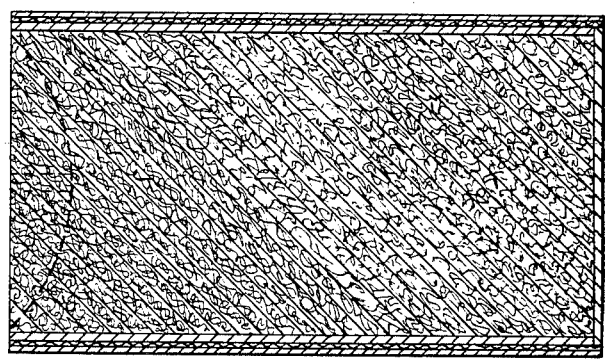
Fig. 3
Fig. 4
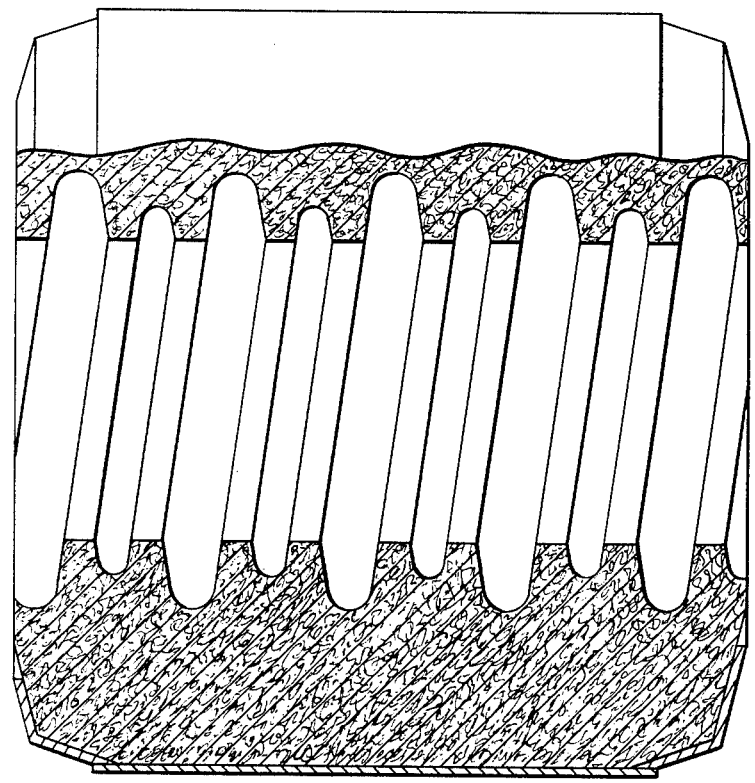
INVENTOR.
Stanley G. Roach

United States Patent Office 3,405,201
Patented Oct. 8, 1968

3,405,201
PROCESS FOR PREPARING PROPELLANT
GRAIN
Stanley G. Roach, Overland Park, Kans., assignor to
Standard Oil Company, Chicago, Ill., a corporation of
Indiana
Filed Dec. 21, 1965, Ser. No. 515,390
7 Claims. (Cl. 264—3)

ABSTRACT OF THE DISCLOSURE

Process for preparation of a propellant grain having a combustible thermoplastic binder material comprising introducing propellant composition at its softening point under pressure through a blending zone into a shape restricting zone and maintaining pressure until the composition assumes the form of the shape restricting zone.

This invention relates to solid propellants having a thermoplastic binder and more particularly to a simplified method for producing said propellant. The method of the present invention is described herein as applied to the production of propellants containing ammonium nitrate as the principal oxidizing agent; however, this should not be deemed a limitation of the method.

In gas generation for rocket or missile usage, it is desirable that the gas affording composition develop gas at a controlled rate. Ammonium nitrate compositions consist essentially of ammonium nitrate particles in an oxidizable organic material (binder) and various other additives such as catalyst for the promotion of combustion, carbon, chemical stabilizer to reduce decomposition, etc. To improve the burning quality, and to utilize the excess free oxygen made available by the decomposition of the ammonium nitrate, oxidizable organic material, which also may function as binder material for the shaping of the ammonium nitrate into grains, are admixed with ammonium nitrate. These oxidizable organic materials may be any thermoplastic known to the art for use in propellant compositions.

The multicomponent binder or matrix former commonly consists of a polymeric base material and a plasticizer therefor. Particularly suitable polymeric base materials are cellulose esters of alkanoic acids containing from 2–4 carbon atoms atoms such as cellulose acetate, cellulose butyrate and cellulose propionate.

The polyvinyl resins such as polyvinyl chloride and polyvinyl acetate are also good bases; styrene acrylonitrile is an example of a copolymer which forms a good base material; polyacrylonitrile is another suitable base material; as are polyamide resins (such as nylons).

The plasticizer component of the binder also, preferably, contains combined oxygen. The oxygen may be present in the plasticizer as an ether linkage and/or hydroxyl and/or carbonyl; also the oxygen may be present as an inorganic substituent, particularly a nitro group.

In general, any plasticizer which is adapted to plasticize the particular polymer may be used. A single plasticizing compound may be used; more usually 2 or more compounds are used in conjunction; for example, acetyl triethyl citrate and triethyl citrate, etc.

The particular requirements with respect to use will determine not only the polymer but also the particular plasticizer or combination of plasticizers which are used. The precise amount of binder is dependent upon the type of material forming the binder as well as the requirements for the particular grain.

The requirement for a solid propellant that is suitable for military use is that it be ballistically stable after long periods of storage at temperatures between +160° F. to −65° F. Many binders have been used to form a shaped solid propellant and include those listed above. The binder material used with the ammonium nitrate to form physically stable grains must be flexible to compensate for changes in volume of the ammonium nitrate as it passes from one temperature to another, since ammonium nitrate exists in several solid forms depending upon the temperature. The binder material must compensate for the changes in the volume in order that such changes will produce a minmum amount of voids and cracks in the grains. Production of fissures in the grain either internally or externally over the surface of the grain creates additional burning surface which results in unpredictablity of the ballistic performance of the grain. Thus, it is necessary to provide a binder material which will provide a shaped grain of satisfactory physical sensibility. Furthermore, such grain must be capable of being ignited at extremely low or relatively high temperatures after being subjected to variable storage temperature conditions and to burn evenly and at such a rate as to distribute the impulse energy in accordance with the service required.

Finely powdered ammonium nitrate contains about 20% or more by volume of void space, and this void space must be completely filled in order to obtain a shaped propellant grain of the desired physical characteristics. Moreover, additional void space is provided when using an inorganic compound as the catalyst, and the binder must not only fill the voids of the ammonium nitrate but also the voids present in the finely powdered inorganic catalyst material.

For military uses, a propellant is desired which has non-detonating characteristics rather than the detonating characteristics of ordinary ammonium nitrate explosives. The burning characteristics of nondetonating explosives are dependent upon the temperature and pressure in the combustion chamber. An intially high temperature of the grain will cause the propellant to operate at a higher combustion pressure and thrust than will a cooler temperature. The firing duration will be shorter, but the total impulse will not be changed significantly. This indicates that the initial temperature of the grain has a decided effect on the burning rate and that weather conditions have to be considered when exacting performance requirements are to be met.

The velocity at which a solid propellant is consumed during operation is called the burning rate. It is measured in a direction normal to the propellant surface and is usually expressed in inches per second. The burning rate may be expressed by the following relation, in which the influence of all performance parameters is small compared to the chamber pressure and the initial grain temperature.

$$r = a p_c^n$$

The burning rate or velocity of propellant consumption $r$ is usually given in inches per second; the chamber pressure $p_c$ in pounds per square inch; $a$ and $n$ are constants. The constant $a$ varies with the initial propellant temperature, and thus the burning rate is a function of the temperature of the grain prior to combustion. For most operations it is desirable that the value of $r$ be as large as possible. The lower the value of $n$, the less is the detonating character of the decomposition of a gas producing composition and the more even and smooth is the burning rate of the propellant grain. Thus, a sustained thrust rather than a detonation is obtained by smooth burning of the grain.

The temperature sensitivity for different solid propellants is usually expressed as the percentage change of thrust per unit of temperature change. Temperature changes effect the equilibrium pressure and the burning rate. The definitions of the temperature coefficients are given by Sutton, "Rocket Propulsion Elements" (2nd ed., 1958).

$$\pi_K = \frac{(\delta \ln p)}{(\delta T)_K} = \frac{1}{p_c} \frac{(\delta p)}{(\delta T)_K}$$

$$\sigma_p + \frac{(\delta \ln r)}{(\delta T)_p} = \frac{1}{r} \frac{(\delta r)}{(\delta T)_p}$$

Here $\pi_K$ is the temperature sensitivity coefficient of equilibrium pressure at a particular value of K (K is the ratio of the burning surface to the throat area), expressed in percent pressure change per degree temperature change. Mathematically it is defined as the partial derivative of the natural logarithm of the equilibrium chamber pressure $p$ with respect to temperature T. The other temperature sensitivity coefficient $\sigma_p$ refers to the change in burning rate $r$ of a solid propellant with respect to temperature T at a particular value of chamber pressure $p_c$. It is also known as the burning rate temperature coefficient, while $\pi_K$ is known as the temperature sensitivity of pressure.

For most propellant applications, as low a temperature coefficient as possible is desirable and even required for engineering design consideration. Lower pressure levels over a given temperature level allows a sizable weight savings for most missile applications.

In order to obtain a substantially controlled rate of gas formation, it is necessary to utilize a particular type of configuration for the gas generating composition and to control the burning area of the composition. Unless very special precautins are taken, all surfaces of the gas generating composition present in the combustion zone will burn. The voids and fissures mentioned above will give rise to two or more surfaces where combustion may take place.

A controlled rate of burning is attained by applying a relatively noncombustible coating to the surface of the propellant body where a direct burning is to be prevented. This coating is commonly referred to as a restrictor or combustion restrictor. The requirements for satisfactory restrictors are stringent. In the first instance, the restrictor must adhere to the surface of the solid propellant body. Also, the restrictor must be substantially nonporous; the presence of pores or holes in the coat results in combustion of the solid propellant at that point with resultant variation in the gas production rate. Also, the restrictor must not develop fissures or cracks under prolonged storage conditions.

Many materials are known in the art for use as combustion restrictors and include those thermoplastics listed above in connection with binder materials, and any restrictor capable of bonding to a propellant composition such as butyl rubber and polyurethane rubber which is provided with pressure sensitive adhesive for bonding.

The complex propellant grain configurations presently being used, on the other hand, take advantage of the ability of a grain to burn at all surfaces. This allows use of a missile requiring a high initial thrust and then a lower level burn rate or a uniform, predictable high burn rate merely by varying the total area initially exposed.

In the past, production of a restricted grain or a grain of complex configuration, meeting the crucial ballistic standards exacted on propellant producers, was a laborious, expensive and time consuming process. The tolerances in size of the grain are usually quite severe, often within ten-thousands of an inch.

A typical prior art method illustrates a process used in overcoming the difficulty encountered in attempting to achieve desirable physical and ballistic properties in a propellant grain. In many instances design and/or other important properties, e.g., temperature stability, etc., were sacrificed because of the inherent limitations of the process. Compression molding, a preferred process presently being used in this art, involves the following steps:

(1) Preheating of a carefully preweighed propellant composition, followed by compression molding of the uncompacted propellant, in an evacuated mold, under heat and hydraulic pressure to form a rough shaped billet and then allowing it to cool.

(2) Machining of the propellant billet to the desired shape and size.

(3) Coating of the machined billet with various materials to aid in restrictor adhesion, allowing the coatings to dry between applications.

(4) Washing the retrictor shell and allowing it to dry, followed by application of a coating to aid in adhesion to the prepared propellant billet.

(5) Assembly of the prepared billet and restrictor, followed by insertion into a restrictor mold.

(6) Heating the loaded restrictor mold under vacuum to the propellant-restrictor softening temperature.

(7) Compression molding of the propellant grain-restrictor assembly in an evacuated restrictor mold to create bonding of the heat softened restrictor to the softened propellant, and allowing the assembly to cool before disassembly.

A specific embodiment of this invention is illustrated by the figures which form a part of this specification:

FIGURE 2 is an end view of a particular grain which may be produced by the process of this invention.

FIGURE 3 is a cross sectional view of the grain of FIGURE 2 cut along line 3—3.

FIGURE 4 is a grain, partly in cross section, with internal screw thread openings which may be produced by the device shown in FIGURE 1.

Figure 1:
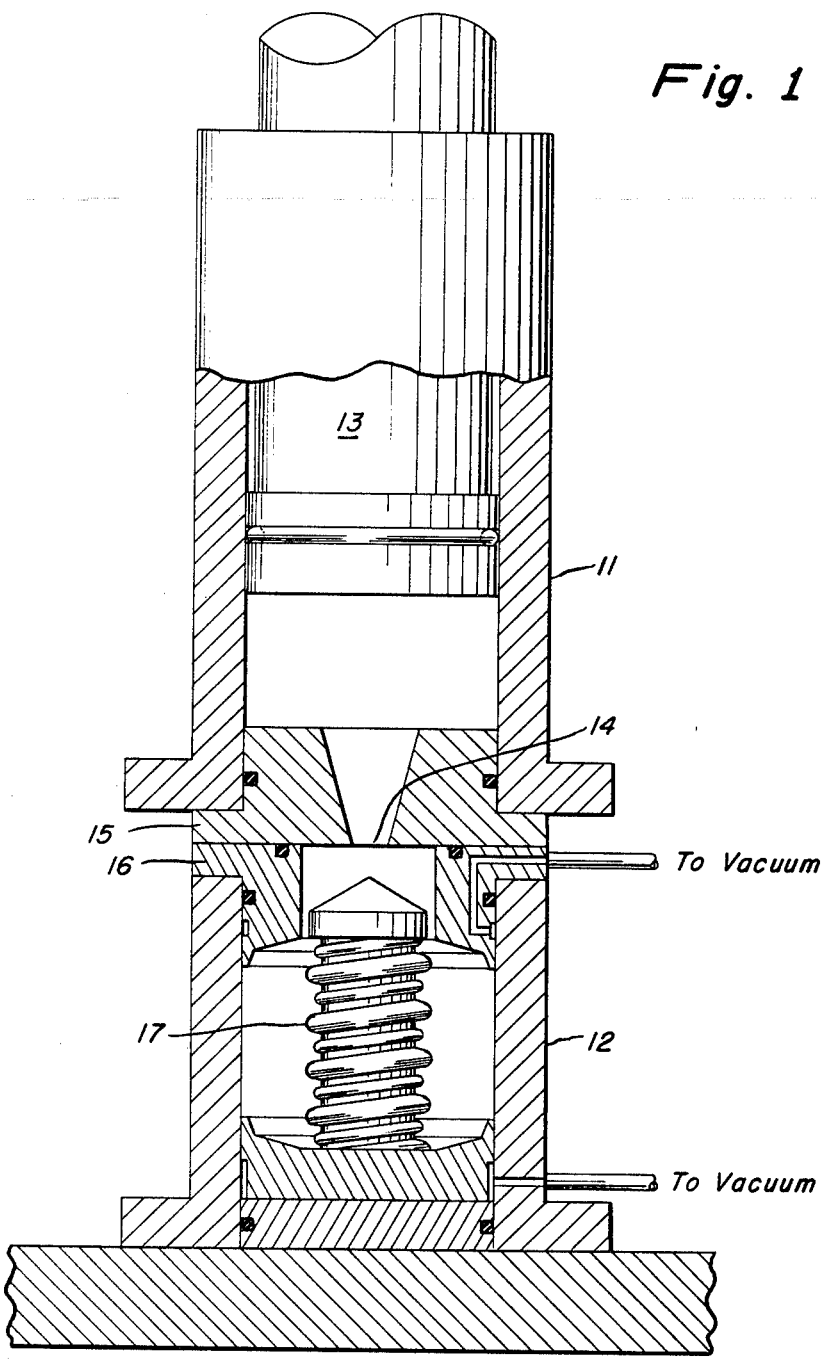
FIGURE 1 is an elevational view, partly in cross section of a device suitable for single-step molding of a propellant grain.

A simplified, economical process for the production of an improved propellant grain comprising a propellant composition containing a combustible thermoplastic binder material, has now been discovered. Very briefly, the process of the present invention is described as follows:

Propellant is introduced, at its softening point, under pressure, through a blending zone, into a shape restricting zone, e.g., a mold, said pressure being maintained until said propellant assumes the form of said shape restricting zone.

Molding is complete in this single-step process because thorough blending of the propellant is accomplished immediately prior to molding. The thorough blending allows complete cohesion within the propellant composition and hence, a continuous phase grain is produced by compression. The blending zone may be any means adapted to blend the propellant composition immediately prior to molding, e.g., a nozzle, a plurality of openings, etc.

More specifically, it is advantageous that propellant be heated to its softening point and then introduced into a chamber having a nozzle, said chamber being adapted to allow pressure to be exerted on said propellant. Pressure is then applied to the propellant, thus forcing said propellant through said nozzle. The propellant flows into a mold for restricting the shape of said propellant and it is preferable that said mold have a vacuum exerted upon it. The pressure is maintained until the propellant is entirely molded and assumes the shape of the mold. The mold may be provided with a combustion restrictor shell prior to the introduction of said propellant into said mold. If a restrictor shell is provided then the pressure must be maintained until the restrictor is bonded to the propellant composition and until the propellant assumes the form of the mold.

The present invention does not require preweighing of the uncompacted preheated propellant as in previous methods, since volume of the restrictor mold will determine the amount of propellant needed for a particular grain. Molding of the grain occurs simultaneously with grain restriction due to the heat and pressure in the system. The grain is then ejected from the mold and allowed to cool.

It should be noted at this point that the present invention may be used in conjunction with extrusion through an orifice for improvement in ballistic properties, which is the subject of a copending application Ser. No. 515,389, filed Dec. 21, 1965. If such extrusion technique is to be used, then the nozzle diameter size and propellant temperature must be carefully regulated to obtain improvement. A preferred diameter size is from 1/16 to 3/4 of an inch, and a temperature of from 100° C. to 125° C. is preferred.

In the prior method a single compression molding step was not feasible because complete bonding of the propellant in a single step was not accomplished. The grain is an agglomeration rather than a continuous phase and it exhibits weld lines when compressed. These weld lines create a rough surface which is highly susceptible to cracking and, therefore, exhibits poor temperature stability. If the restrictor is bonded to such a surface without machining, air bubbles may be entrapped, thus causing uneven burning.

These undesirable physical limitations are absent when the process of my invention is used. The process of my invention allows formation of a continuous phase grain without exhibiting weld lines.

One particular embodiment of the process of this invention, as described in connection with the annexed figures, comprises: low temperature heating and blending of the propellant composition to distribute the ingredients in a homogeneous manner; heating the propellant to a temperature which will bring the thermoplastic binder to its softening point; and introducing the heated propellant into the preheated upper mold chamber 11. The propellant may also be heated directly in the chamber by the process of induction heating, which comprises passing an electromagnetic field across said propellant. A preferred temperature range for the propellant is from 100° C. to 125° C. and for the chamber is 90° C. to 110° C. A washed and dried restrictor shell (not shown) is inserted into the lower restriction mold 12 which is contiguous with said upper chamber. A vacuum of at least 25" mercury should be exerted on the restriction mold for a minimum of one minute. Pressure is then exerted on the propellant composition by means of a ram piston 13 situated in said upper chamber. The pressure should be at least 2,000 p.s.i. and must be high enough to bond the restrictor to the propellant. A preferred pressure range would be between 10,000 and 11,000 p.s.i. The propellant composition is then forced through the nozzle 14, said nozzle being positioned in a removable plate 15, plate 15 in contact with plate 16 and the pressure should be maintained for a time sufficient to cause maximum bonding. The preferred minimum nozzle diameter should be in the range of 1/2" to 3/4 of an inch. The completed grain is then ejected from the mold and allowed to cool.

By insertion of a shaped mandrel 17 in the restriction mold, a grain may be produced with a complex configuration of the internal surfaces area. In addition, the outside configuration of the grain may be altered in a great variety of configurations merely by varying the shape of the restriction mold itself. FIGURES 2, 3 and 4 are illustrative of the complex grain configuration which may be produced by a particular embodiment of the invention. FIGURES 2 and 3 show a cylindrical grain restricted on one end and along its entire length. An internal star configuration has been molded at the other end. FIGURE 4 exhibits an internal screw thread opening in a partially restricted cylindrically shaped grain. It is advantageous when using a mandrel to use a polytetrafluoroethylene (Teflon) coated mandrel in order to eliminate any difficulty caused by the propellant composition sticking to the mandrel.

The process of this invention may also be a great time and labor saver because of the fact that more than one grain may be molded at a time. For instance, a single chamber may be connected to a number of restriction molds, in which case the process is limited only by press capacity.

It has also been found that the invention is applicable not only to propellants prepared by the conventional method, i.e., premixing in a sigma blend mixer, but is particularly suitable in connection with the "dry blend process." The dry blend process offers the advantages of ease of processing, larger lot size and ballistic reliability, with subsequent overall reduced manufacturing costs. The process involves essentially the physical pre-blending of dry components followed by oven heating to the molding temperature. Thus, by separate mixing and heating of dry powders the propellant processing is reduced to a continuous machine operation.

Briefly, the procedure is as follows: The oxidizer is ground to a size suitable for the use which the particular propellant is to be put, as is the preformed binder. For a composition containing ammonium nitrate as the primary oxidant, the mesh size is preferably 270–325 for the nitrate, and 120 for the binder. All the propellant ingredients are then dry mixed in a rotating container, and the resulting dry blend is then placed in an oven and heated to between 90 and 100° C., after which, the composition may molded in accordance with the process of this invention, or by a prior art method.

EXAMPLES

In the following examples, the propellant composition set forth below was prepared into grains in accordance with the process listed in the specific examples. The resulting grain was then cut into strands and burned in a Crawford bomb. The results of such tests are reported in Table I.

| Formulation: | Percent |
|---|---|
| Ammonium nitrate | 60.80±1 |
| Cellulose acetate | 11.00±1 |
| Acetyl trietyl citrate | 10.75±1 |
| Dinitrophenoxy ethanol | 10.25±1 |
| Carbon black | 3.00±0.03 |
| Sadium barbiturate | 3.00±0.03 |
| Toluene diamine | 0.90±0.03 |
| N-phenylmorpholine | 0.10±0.03 |
| Duomeen-T | 0.20±0.03 |

EXAMPLE 1

A propellant composition was prepared in a sigma blade mixer by concurrent mixing and heating. The propellant was then shaped into a grain by compression molding process, described above as a prior art method.

EXAMPLE II

The propellant composition was shaped into a grain by means of the following steps: heating said composition to a temperature of approximately 115° C.; introducing said composition into an upper chamber heated to a temperature of approximately 100° C.; inserting a washed and dried restrictor shell into a lower restriction mold which is contiguous with said upper chamber. The system is then sealed and a vacuum of approximately 25 inches Hg is exerted on said restriction mold for a period of one minute. A ram piston, situated in said upper chamber, is actuated to exert a pressure of around 10,000 p.s.i. on the propellant composition which is then forced through a conical nozzle 3/4 inch minimum diameter, said nozzle being provided in a plate positioned at the bottom of said upper chamber. The pressure is maintained for two minutes. The mold assembly is then opened and the grain ejetced and allowed to cool.

EXAMPLE III

The propellant composition was prepared in the dry blend process by the following steps:

Ammonium nitrate is ground to a 270–325 mesh size and the cellulose acetate is ground to a 120 mesh size. The other ingredients are then added and the entire composition is dry mixed in a rotating container, after which it is heated to approximately 95° C. The composition is then shaped into a grain by the process of Example I.

EXAMPLE IV

The propellant composition, prepared as in Example III, was shaped into a grain by the process of Example II.

EXAMPLE V

The procedure of Example II was followed except the composition was extruded through a ⅛″ nozzle prior to molding.

EXAMPLE VI

The procedure of Example IV was followed except the composition was extruded through a ⅛″ nozzle prior to molding.

TABLE I

| SAMPLE | $r^{1,000}$ (in./sec.) | $\sigma I$ (percent ° F.) | $\pi K$ | n |
|---|---|---|---|---|
| (1) Grain of Ex. I | 0,081 | 0,11 | 0,26 | 0,55 |
| (2) Grain of Ex. II | 0,080 | 0,08 | 0,16 | 0,53 |
| (3) Grain of Ex. III | 0,062 | 0,18 | 0,36 | 0,50 |
| (4) Grain of Ex. IV | 0,078 | 0,175 | 0,36 | 0,51 |
| (5) Grain of Ex. V | 0,080 | 0,08 | 0,16 | 0,48 |
| (6) Grain of Ex. VI | 0,086 | 0,13 | 0,30 | 0,56 |

It may be seen from the data in Table I that the process of this invention, not only provides an efficient, time saving and economical process for the production of propellant grains, but also improves ballistic properties to some extent.

What is claimed is:

1. A process for the preparation of a propellant grain comprising a propellant composition containing an oxidizer and a combustible thermoplastic binder material, which process comprises introducing said propellant at its softening point under pressure through a blending zone, into a shape restricting zone, and maintaining said pressure until said propellant assumes the form of said shape restricting zone.

2. The process of claim 1 wherein said shape restricting zone is provided with a combustion restrictor prior to receiving said propellant composition and said pressure is maintained until said propellant assumes the form of said shape restricting zone and until said combustion restrictor is bonded to said propellant composition.

3. A process for the preparation of a propellant grain comprising a propellant composition containing an oxidizer and a combustible thermoplastic binder material, which process comprises introducing said propellant composition after it has been heated to its softening point into a chamber having a nozzle, said chamber being adapted to allow pressure to be exerted on said propellant; applying pressure to said propellant thus forcing said propellant through said nozzle and into a mold, said mold having exerted upon it a vacuum, and maintaining said pressure until said propellant assumes the form of said mold.

4. The process of claim 3 wherein said mold is provided with a combustion restrictor prior to receiving said propellant composition and said pressure is maintained until said propellant assumes the form of said mold and until said combustion restrictor is bonded to said propellant composition.

5. The process of claim 3 wherein said propellant is heated to a temperature of from 100° C. to 125° C. prior to introduction into said chamber and said chamber is heated to a temperature of from 90° C. to 110° C. prior to the introduction of said propellant said thermoplastic binder material being fluid, and at such viscosity the said temperature has to be adapted to be sheared without degradation of the physical properties of said binder.

6. The process of claim 3 wherein said pressure is at least 2,000 p.s.i.

7. A process for the preparation of a propellant grain comprising a propellant composition containing an oxidizer and a combustible thermoplastic binder material, which process comprises grinding the ingredients of said propellant composition, dry mixing said ingredients, heating said propellant composition, introducing said propellant under pressure through a blending zone, into a shape restricting zone, and maintaining said pressure until said propellant assumes the form of said shape restricting zone.

References Cited

UNITED STATES PATENTS

| | | | |
|---|---|---|---|
| 2,920,443 | 1/1960 | Higginson | 264—3 |
| 2,926,386 | 3/1960 | Hutchinson | 264—3 |
| 2,929,697 | 3/1960 | Perry et al. | 264—3 |
| 2,939,176 | 6/1960 | Adelman | 264—3 |
| 3,056,171 | 10/1962 | Fite | 264—3 |
| 3,186,035 | 6/1965 | Grace | 264—3 |
| 3,252,369 | 5/1966 | Bartley et al. | 264—3 |
| 3,263,613 | 8/1966 | Rice et al. | 264—3 |

L. DEWAYNE RUTLEDGE, *Primary Examiner.*

UNITED STATES PATENT OFFICE
CERTIFICATE OF CORRECTION

Patent No. 3,405,201                      October 8, 1968

Stanley G. Roach

It is certified that error appears in the above identified patent and that said Letters Patent are hereby corrected as shown below:

Column 3, lines 3 to 8, the formula should appear as shown below:

$$\pi_K = \frac{(\delta \ln p)}{(\delta T)_K} = \frac{1}{p_c} \frac{(\delta p)}{(\delta T)_K}$$

$$\sigma_p = \frac{(\delta \ln r)}{(\delta T)_p} = \frac{1}{r} \frac{(\delta r)}{(\delta T)_p}$$

Column 4, line 10, "retrictor" should read -- restrictor --. Column 5, line 20, after "If" insert -- a --; line 59, "surface should read -- surface --. Column 6, line 26, after "may" inse -- be --; line 39, "Acetyl trietyl citrate" should read -- Acetyl triethyl citrate --; line 42, "Sadium barbiturate" shoul read -- Sodium barbiturate --; line 50, after "by" insert -- th --. Column 7, TABLE I, second, third, fourth and fifth columns thereof, the comma in each number should be a period; same tabl heading to the third column, "σI (percent ° F.)" should read -- σp (%/° F.) --.

Signed and sealed this 3rd day of March 1970.

(SEAL)
Attest:

EDWARD M. FLETCHER, JR.                      WILLIAM E. SCHUYLER, JR
Attesting Officer                                Commissioner of Patents